United States Patent [19]

Mitchell

[11] Patent Number: 5,047,150

[45] Date of Patent: Sep. 10, 1991

[54] SETTLED SOLIDS REMOVAL MECHANISM

[76] Inventor: James Mitchell, 749 Hillcrest Ave., El Segundo, Calif. 90245

[21] Appl. No.: 487,875

[22] Filed: Mar. 5, 1990

[51] Int. Cl.$^5$ ............................................. B01D 17/025
[52] U.S. Cl. ..................................... 210/525; 210/527
[58] Field of Search ......................... 210/523, 525, 527

[56] References Cited

U.S. PATENT DOCUMENTS

| | | | |
|---|---|---|---|
| 3,627,668 | 12/1971 | Wethly | 210/527 X |
| 3,935,104 | 1/1976 | Russell et al. | 210/527 X |
| 3,969,249 | 7/1976 | Dodd | 210/527 X |
| 4,094,338 | 6/1978 | Bauer | 210/523 X |
| 4,401,576 | 8/1983 | Meurer | 210/525 X |

Primary Examiner—Charles Hart
Attorney, Agent, or Firm—Plante, Strauss, Vanderburgh and Connors

[57] ABSTRACT

There is disclosed a solids collection and removal system for a settling tank. It is particularly designed for installation in generally rectangular, in-ground settling tanks such as is commonly used for water treatment. The collection device includes a plurality of bottom-travelling collectors which have elongated, open-bottomed channel housings, each with a scraper blade pivotally supported by a pin-in-slot attachment to provide a modified pendulum suspension. The collectors, which span the width of the tank, are mounted on a track or other suitable mechanical linkage for oscillatory travel across preselected portions of the bottom of the settling tank. Each collector is divided by a longitudinal baffle into a lowermost collection chamber and an upper evacuation chamber. The latter is connected through a conduit to a vacuum system for the evacuation of the solids from the collectors.

8 Claims, 4 Drawing Sheets

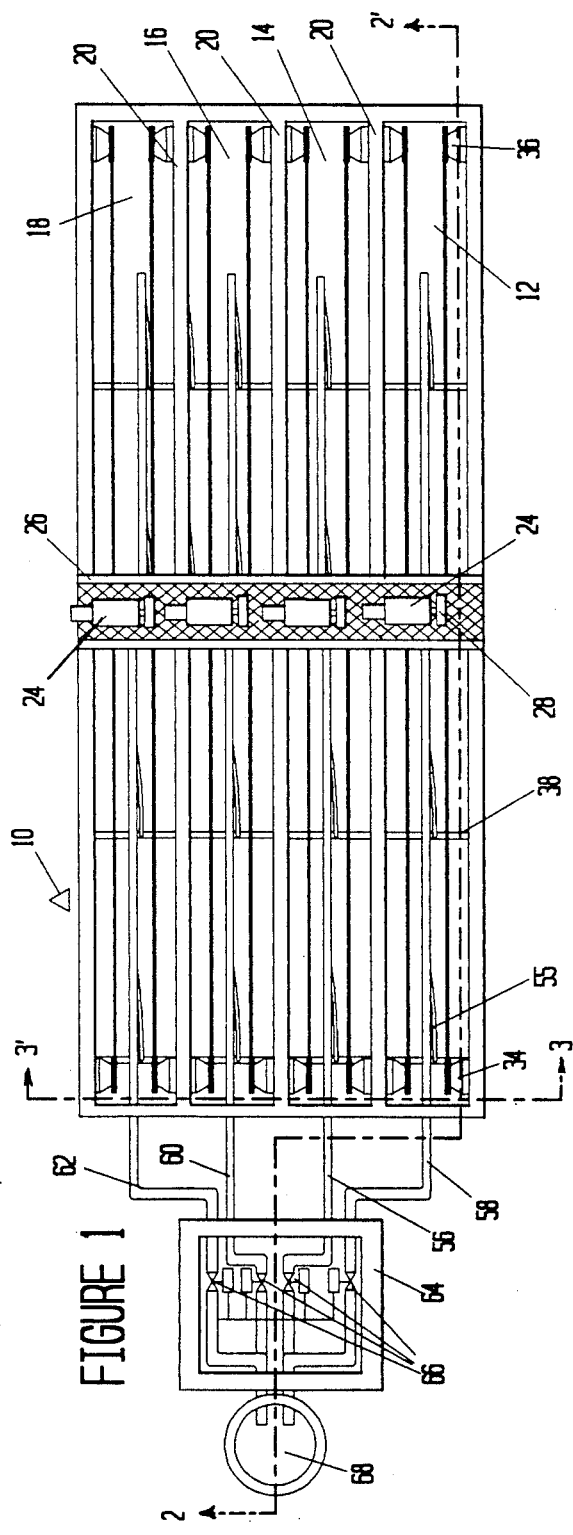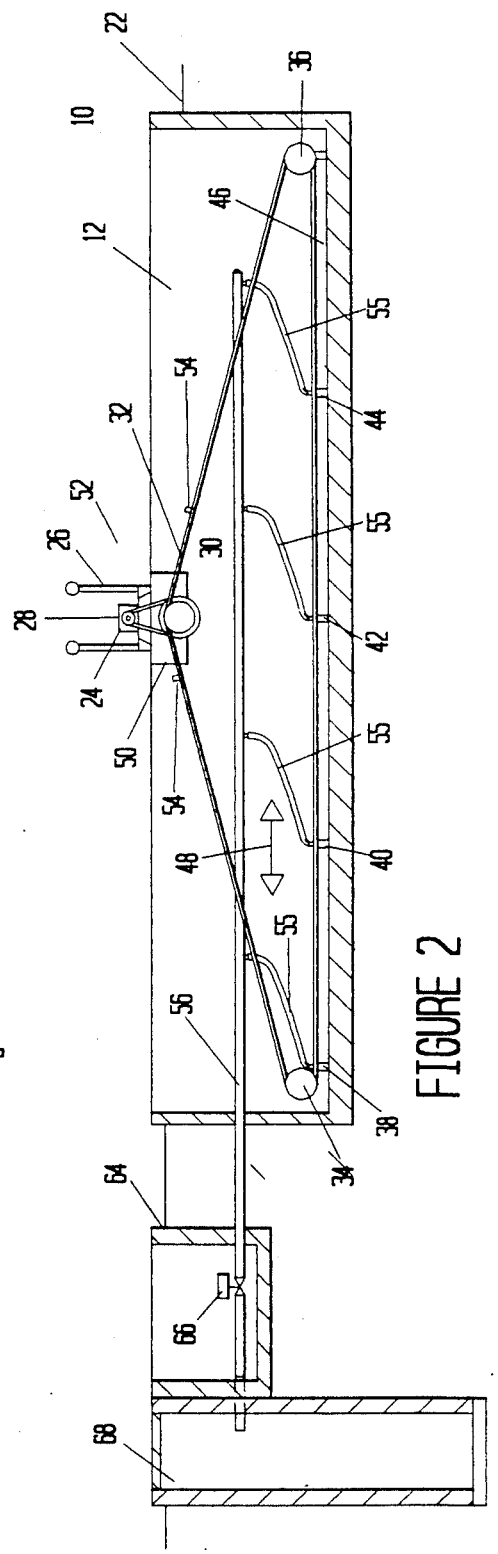

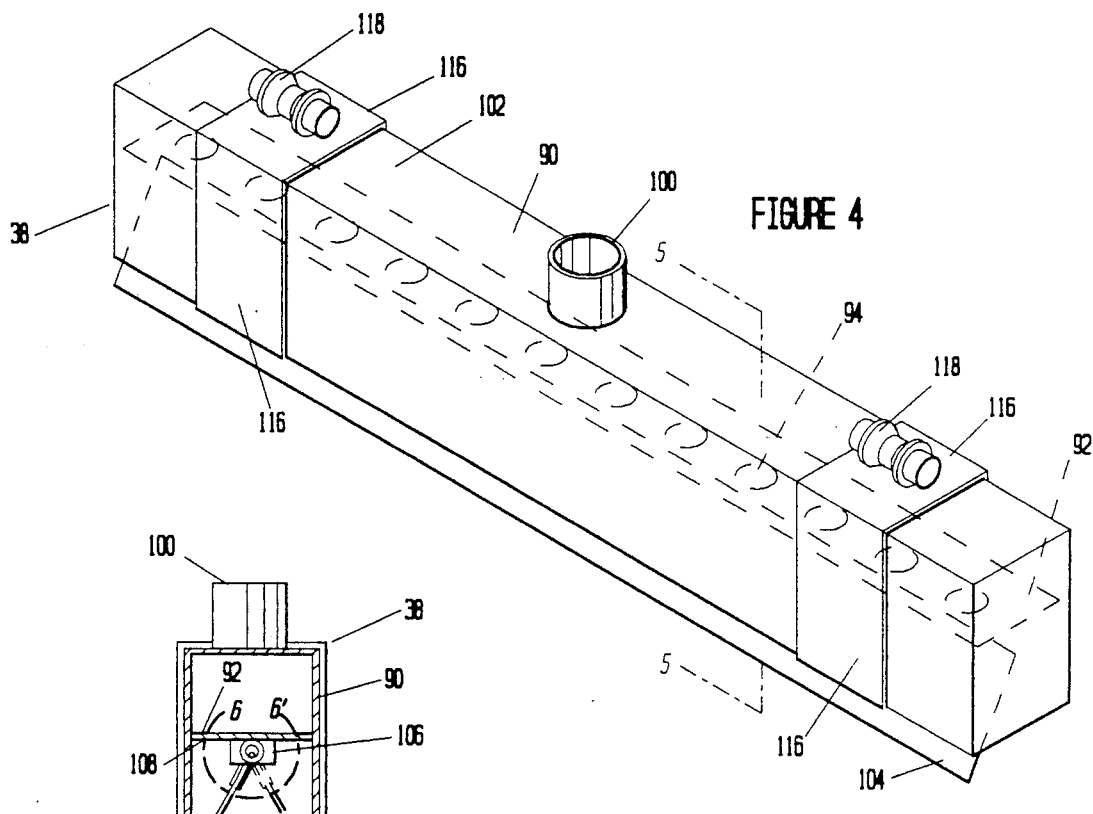
FIGURE 4
FIGURE 5
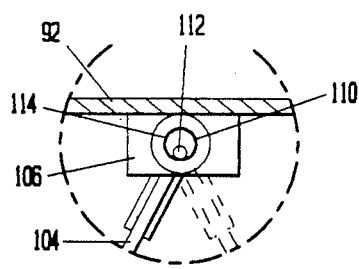
FIGURE 6

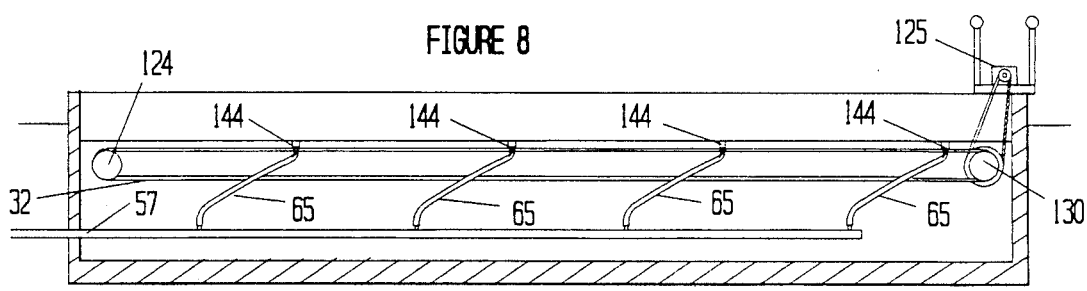
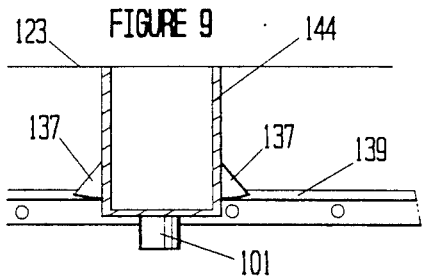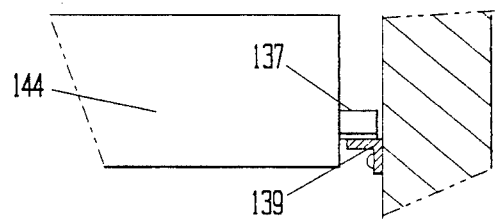
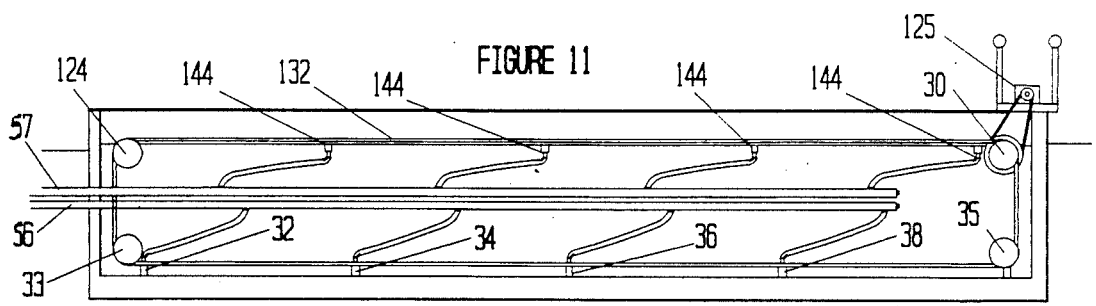

SETTLED SOLIDS REMOVAL MECHANISM

BACKGROUND OF THE INVENTION

1. Field of The Invention

This invention relates to a solids removal device and, in particular, to a solids collector and evacuator syStem for a settling tank.

2. Brief Statement of the Prior Art

Settling and clarification are unit operations which are practiced by municipalities and industrial concerns to remove suspended solids from liquids. In particular, water treatment facilities often incorporate settlers or clarifiers for treatment of fresh or waste water. When large volumes of water are treated, as typically encountered in municipal water and sewage treatments, the settling tanks are commonly inground tanks of cast concrete construction. In these settling tanks, various devices have been proposed to remove and collect the solids which are settled from the water during the treatment.

One common system employs a plurality of scrapers in the form of channels that are mounted on a continuous, driven chain which drags the scraper blades across the bottom surface of the tank, pushing the settled solids to removal station which has a hopper to collection the solids and a bucket elevator which scoops the solids from the hopper and lifts them from the tank.

Solids are usually detained in the aforedescribed solids removal system for times which exceed optimum detention times for biological applications. Additionally, the solids collection hopper is difficult to incorporate in some installations. Also the mechanical removal system has a high incidence of repair and maintenance requirements for its various mechanical components. Often the water being treated is corrosive and the latest systems have incorporated plastic (Nylon) gears and tracks and fiberglass scrapers. Another difficulty encountered with the aforementioned removal system is that when liquid which contains a large amount of solids is encountered, the solids can clog or obstruct the operation of the system, requiring operator intervention.

OBJECTIVES OF THE INVENTION

It is an objective of this invention to provide a high-efficiency solids collection and removal system for a settling tank.

It is also an objective of this invention to provide a solids collection and removal system for a settling tank which has low maintenance and repair requirements.

It is a further object of this invention to provide a solids collection and removal system utilizing a vacuum system for removing collected solids from a settling tank.

It is also a further object of this invention to provide a solids collecting and removal system using a solids collector which has an oscillatory travel on the bottom surface of a settling tank.

It is an additional object of this invention to provide a solids collection and removal system with solids collectors which have evacuation chambers for connection to a vacuum system for solids removal.

BRIEF DESCRIPTION OF THE INVENTION

This invention comprises a solids collection and removal system for a settling tank. It is particularly designed for installation in generally rectangular, inground settling tanks such as is commonly used for water treatment. The collection device includes a plurality of bottom-travelling collectors which have elongated, open-bottomed channel housings, each with a scraper blade pivotally supported by a pin-in-slot attachment to provide a modified pendulum suspension. The collectors are mounted on a track or other suitable mechanical linkage for oscillatory travel across preselected portions of the bottom of the settling tank. For this purpose, the collectors span the width of the settling tank. Each collector is divided by a longitudinal baffle into a lowermost collection chamber and an upper evacuation chamber. The latter is connected through a conduit to a vacuum system for the evacuation of the solids from the collectors.

BRIEF DESCRIPTION OF THE DRAWINGS

FIG. 1 is a plan view of an in-ground settling tank equipped with the solids removal system of the invention;

FIG. 2 is an elevational sectional view on line 2-2' of FIG. 1;

FIG. 4 is a perspective view of the solids collection scraper of the invention;

FIG. 5 is a sectional view on line 5-5' of FIG. 4;

FIG. 6 is an enlarged sectional view of the area 6-14 6' of FIG. 5;

FIG. 8 is an elevational sectional view of a settling tank provided with a liquid surface skimmer;

FIG. 9 is an enlarged view of the area 9-9' of FIG. 8;

FIG. 10 is a view along line 10-10' of FIG. 9; and

FIG. 11 is an elevational sectional view of a settling tank with the surface skimmer of FIG. 8 and the solids removal system shown in FIG. 1.

DESCRIPTION OF PREFERRED OF EMBODIMENT

Figure 3:
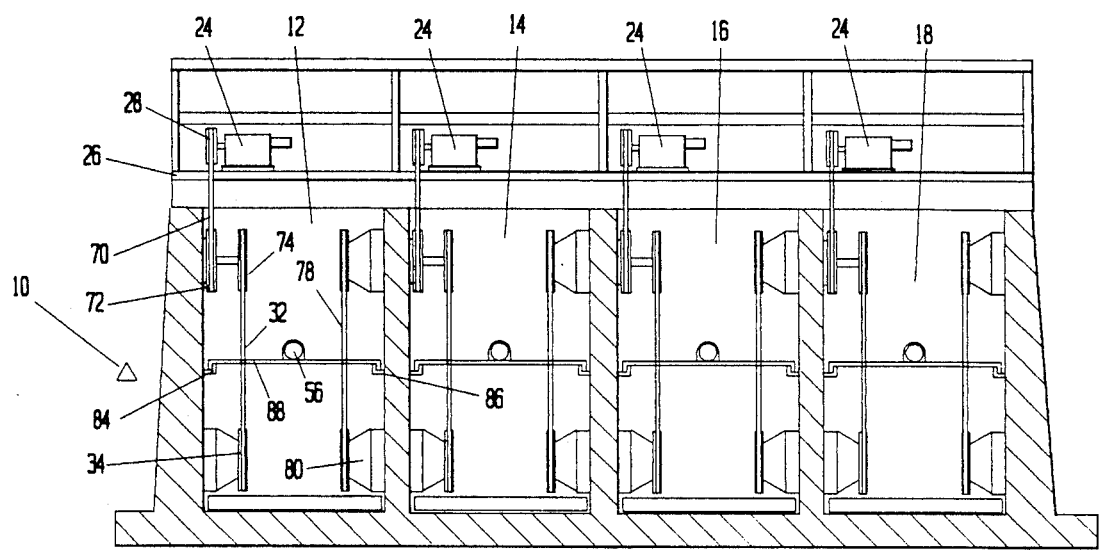
FIG. 3 is a sectional view on line 3-3' of FIG. 1.

The invention is shown installed in a typical in-ground settling tank 10 shown in FIG. 1 as including four longitudinal basins 12, 14, 16 and 18 separated by internal walls 20. Typically the settling tank 10 is formed of cast concrete walls and is located beneath the ground surface 22 as illustrated in the sectional view of FIG. 2.

Each of the settling basins 12-18 with the tank 10 is provided with the solids collection and removal system of the invention. As illustrated in FIG. 2, settling basin 12 has a solids collection assembly which includes a power supply station 52 having a drive motor 24 mounted on a central catwalk 26 and having a drive sprocket 28 that is mechanically linked to a transfer sprocket 30. A continuous chain 32 extends over the transfer sprocket 30 and over distally mounted idler sprockets 34 and 36, which are located at opposite bottom ends of each basin. As shown in FIG. 1, each of the basins has two pairs of idler sprocket wheels located at each of the bottom corners of each basin and each collector, such as 38, spans between a pair of drive chains 32. Each pair of chains 32 carries a plurality of solids collectors 38-44.

In the illustration, four collectors 38, 40, 42 and 44 are shown in FIG. 2 and each of these collectors is positioned to ride on the bottom interior wall 46 of the settling basin 12.

The collectors 38-44 are adapted for oscillatory movement and each is located at a preselected position and is supported between chains 32 for oscillatory movement as indicated by the double arrowhead lines 48 of FIG. 2. Limit switches 50 are placed at the power supply station 54 and these limit switches are contacted by arms 54 carried on a continuous chain 32 to reverse the direction of rotation of the motor 24 and reverse the travel of the solids collectors 38-44 at the limits of their oscillatory movement.

Each collector 38-44 is connected by a flexible conduit or hose 55 to a central evacuation conduit 56 that extends longitudinally down the center of each settling basin. The evacuation conduits 56, 58, 60 and 62 (see FIG. 1) are passed into a control sump 64 which can also be a cast concrete pit in which a plurality of control valves 66, one for each of the evacuation conduits, is positioned. The control valves 66 regulate the vacuum applied to each conduit.

The evacuation conduits 56-62 discharge into a central solids receiving receiver, typically an underground silo 68 to which a vacuum pump (not shown) is attached to apply a vacuum to the system.

Referring now to FIG. 3, the structure of the basins and solids collector is illustrated in an in sectional view along line 3-3' of FIG. 1. As there illustrated, the settling basin 10 is divided into four longitudinal basins 12-18, each of which receives a collector assembly. Each collector assembly is provided with a separate drive motor 24 located on the catwalk 26 extending transversely across the settling basin 10. The drive sprocket 28 on the drive shaft of each motor 24 is linked with a belt or chain 70 to an idler assembly of a driven sprocket 72 and a driving sprocket 74 on a common shaft 76. A continuous chain 32 extends about the driving sprocket 74 and the opposite, distally located idler sprockets such as 34 at each end of the settling basin. A duplicate chain 78 is provided over a second pair of distal sprockets such as 80 which are located adjacent the bottom wall of the basin and a single upper centrally positioned idler sprocket 82. Support brackets 84 and 86 are provided on each side wall of the basin at an intermediate height and a support brace 88 is carried by these brackets to support the evacuation conduit 56.

Referring now to FIGS. 4-6, the solids collectors 38 used in the invention will be described. As previously mentioned, a plurality of these collectors are located at preselected locations along the chains 32 to sweep a preselected area of each of the settling basins. Each of the collectors 38 has a sufficient length to span the entire width of its respecting settling basin. The collector has a housing 90 which is a generally open-bottom, closed-end, rectangular channel.

At an intermediate level within the housing 90, a single co- extensive transverse baffle 92 is provided extending longitudinally of the interior of the housing 90, dividing the housing into an upper, evacuation chamber 96 and a lower, collection chamber 98. A plurality of through apertures 94 are provided in baffle 92 to permit communication between the evacuation chamber 96 and the lower collection chamber 98. A nozzle 100 is located at a central position in the top wall 102 of the housing 90 and this nozzle receives flexible conduit 55 which extends to the evacuation conduit 56, described previously with reference to FIG. 1 and 2.

A single wiper 104 is pivotally supported, pendulum fashion, within the lower collection chamber 98 of the collector housing 90. As shown in FIG. 5, support brackets 106 are mounted on the undersurface 108 of the longitudinal baffle 92 and each of these brackets 106 has a journal 110 which supports a shaft 112 to which the wiper 104 is secured. As illustrated in FIG. 6, the journal has a large diameter aperture 114, considerably greater than the diameter of the shaft 112, thereby permitting translatory movement of the shaft 112 within the journal 110 and permitting the wiper blade to reverse its positions between the position shown in the solid lines to the reverse position shown in broken or dashed lines of FIG. 5, when the direction of movement of the collectors 38-44 is reversed. In this fashion, the wiper blade will always swing to the trailing edge of its collector.

In operation, the solids which settle from water that is received in the settling basin will collect on the bottom wall 46. The wiper blade 104 will pivot from side-to-side, assuming its position along the trailing edge of the collector as the collector is moved. In this fashion, the wiper will take the position shown in the solid lines w6en the collector is moved in the direction indicated by the solid arrowhead line of FIG. 5 and will move to the opposite side, shown in a dashed line when the collector is moved in the direction shown by the broken arrowhead line of FIG. 5. The collectors are provided with external reinforcement plates 116 at their point of attachment to the endless chains. A conventional flight attachment shaft 118 is supported on each of the upper reinforcement plates.

Figure 7:
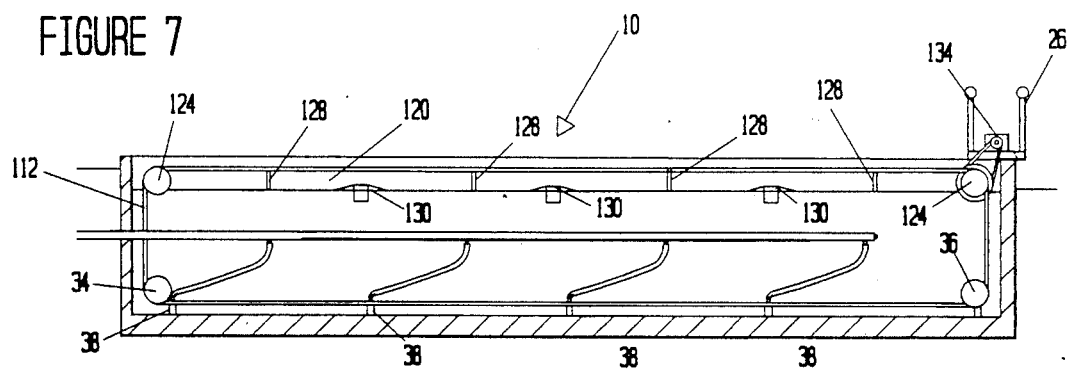
FIG. 7 is a sectional view of an alternative embodiment of the invention which has an optional surface skimmer

In some applications, insoluble solids will float to the top of the liquid within the settling basin and it is desirable to provide some facility for removing these solids. FIG. 7 is an elevational sectional view of a suitable modification of the invention to provide a skimmer 120 at the top of the liquid that will move the solids floating on the surface of the liquid into a removal trough that is centrally located. For this purpose, the continuous chains 112 which support the collectors 38 and move them in an oscillatory travel on the bottom surface of the basin are extended over upper, distal idler sprockets 124 to provide a horizontally disposed upper chain from which one or more weighted skinner blades 128 are attached. The skimmer blades 128 are located adjacent to a plurality of troughs 130 that are mounted transversely across the settling basin. Preferably each of the troughs 130 has an inclined ramp 122 along its side to permit the weighted skimmer blades 128 to push the floating solids into the collection troughs 130. For this application, the drive motors 134 are located at one end of the settling basin, adjacent one of the distal upper idler sprockets 124.

The collectors of the invention can also be adapted for use as simmers to remove solids which float on the surface of water within the settling basins. FIG. 8 illustrates this modification. The collectors 144 are inverted from their positions when used as bottom solids collectors, so the open sides of the collector housings face upwardly. Each collector 144 discharges into a solids removal hose 65 which extends to an evacuation conduit 57. The collectors are mounted between continuous chains 132 which pass over idler sprockets 124 and a drive sprocket 130. The latter is driven with a motor 125. As shown in greater detail in FIG. 9, each collector 144 forms an open-top trough with its upper edges at the water level 123. The collector 144 has a conduit 101 for attachment of the solids removal hose 65. At each end of the collector is attached a shoe 137 which rides on a track 139 that is attached to the sidewall of the basin; see FIG. 10.

FIG. 11 shows the combination of the solids collection and removal system of FIG. 1 in combination with the surface skimmer of FIG. 10. In this application, the collectors 32–40 can be mounted on the same chains 132 as the surface skimmers 144. For this application, idler sprockets 124 are located at opposite, upper corners of the basin and the chains 32 pass over sprockets 34 and 36 and 124. Preferably, the installation is provided with evacuation conduits 57 for the skimmer and separate evacuation conduits such as 56 for the bottom collector and removal system.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A solids collection device for removing settled solids from the bottom surfaces of liquid-containing tanks which comprises:
    (a) at lease one bottom surface travelling collector comprising a collector housing which extends transversely across said bottom surface with an open undersurface and a coextensive orifice plate located at an intermediate vertical position in said collector housing to subdivide said housing into an upper vacuum chamber and a lower collection chamber, a wiper blade pivotally supported on the undersurface of said orifice plate and extending downwardly below the lower edges of said housing;
    (b) travelling motive means comprising a motor means and mechanical linking means connected to said travelling collector to move said collector in a longitudinal direction along the bottom surface of said tank; and
    (c) direction reversing means operatively connected to said motor means to reverse direction of said motor means and thereby reverse the travel of said travelling collector means, whereby said collector means is oscillated across a preselected area of said bottom surface of said tank, with said wiper blade pivotally moving between wiping positions at the trailing edge of said collector.

2. The solids collection device of claim 1 wherein said motor means is an electric motor and said direction reversing means comprises movement limit switches in circuit to the power supply to said motor and effective to reverse rotational movement of said motor.

3. The solids collection device of claim 2 wherein said travelling motive means includes a continuous flexible chain, idler wheels at opposite bottom ends of said tank, with said flexible chain extending to and about said idler wheels and across a drive sprocket in driven geared connection to the power output shaft of said drive motor.

4. The solids collection devioe of claim 1 wherein said wiper means has pivot pin means carried along its upper edge and received within a larger diameter aperture on support bracket means mounted on the undersurface of said orifice plate, thereby permitting oscillation of the pivot axis of said wiper as said wiper pivots between its positions in said collector housing.

5. The solids collection device of claim 1 including vacuum means to develop a vacuum, flexible hose means extending therefrom to said collector housing and housing port means in said housing communicating between said flexible hose and said vacuum chamber.

6. The solids collection device of claim 1 including a plurality of said collectors located at spaced intervals along the length of said tank.

7. The solids collection device of claim 6 wherein said reversing means is effective to cause oscillation of said travelling movement of said collectors within each of said spaced intervals.

8. A solids collection device for collecting solids floating on the top surface of liquid within a containing tank and delivering the collected solids to a solids evacuation conduit extending from said tank, which comprises:
    (a) a plurality of top surface travelling collectors, each comprising a collector housing which extends transversely across said upper portion of said tank with an open upper surface which is supported at the top surface of liquid within said tank;
    (b) collector housing support means comprising a support member at each end of said housings, and a supporting track secured on the opposite, inside walls of said tank to slidably support said support members;
    (c) travelling motive means comprising a motor means and mechanical linking means connected to said travelling collector to move said collector in a longitudinal direction along the bottom surface of said tank;
    (d) direction reversing means operatively connected to said motor means to reverse direction of said motor means and thereby reverse the travel of said travelling collectors, whereby said each of said collectors is oscillated across a preselected area of said top surface of said tank; and
    (e) solids evacuation means comprising a flexible conduit connected to each of said collectors at one end and connected at its opposite end to said solids evacuation conduit.

* * * * *

UNITED STATES PATENT AND TRADEMARK OFFICE
CERTIFICATE OF CORRECTION

PATENT NO. : 5,047,150

DATED : September 10, 1991

INVENTOR(S) : James Mitchell

It is certified that error appears in the above-identified patent and that said Letters Patent is hereby corrected as shown below:

Col. 6, Line 8, delete "devioe" and replace with --device--

Col. 5, Line 28, delete "lease" and replace with --least--

Signed and Sealed this

Twenty-second Day of December, 1992

Attest:

DOUGLAS B. COMER

*Attesting Officer*   *Acting Commissioner of Patents and Trademarks*